(12) United States Patent
Carrigan et al.

(10) Patent No.: US 7,701,969 B2
(45) Date of Patent: Apr. 20, 2010

(54) CONTROL OF PLMN MESSAGING SERVICES IN IP DOMAINS

(75) Inventors: Michael Carrigan, Dublin (IE); Brendan McGee, Dublin (IE)

(73) Assignee: Markport Limited, Dublin 1 (IE)

( * ) Notice: Subject to any disclaimer, the term of this patent is extended or adjusted under 35 U.S.C. 154(b) by 1501 days.

(21) Appl. No.: 10/984,963

(22) Filed: Nov. 10, 2004

(65) Prior Publication Data

US 2005/0117602 A1  Jun. 2, 2005

Related U.S. Application Data

(63) Continuation of application No. PCT/IE03/00073, filed on May 13, 2003.

(60) Provisional application No. 60/379,404, filed on May 13, 2002.

(51) Int. Cl.
*H04J 3/16* (2006.01)
*G06F 15/173* (2006.01)

(52) U.S. Cl. .................... 370/466; 709/223

(58) Field of Classification Search ........... None
See application file for complete search history.

(56) References Cited

U.S. PATENT DOCUMENTS 5,771,459 A   6/1998  Demery et al. .......... 455/517
7,039,037 B2*  5/2006  Wang et al. ............. 370/349
2001/0049730 A1*  12/2001  Brendes et al. ........... 709/223
2002/0141358 A1*  10/2002  Requena .................. 370/329
2003/0026289 A1*  2/2003  Mukherjee et al. ........ 370/466
2008/0228892 A1*  9/2008  Staack et al. ............. 709/206

FOREIGN PATENT DOCUMENTS

| EP | 0821507 | 1/1998 |
|---|---|---|
| WO | WO00/74409 | 12/2000 |
| WO | WO01/56308 | 8/2001 |
| WO | WO02/060198 | 8/2002 |
| WO | WO03/003653 | 1/2003 |

* cited by examiner

*Primary Examiner*—Ricky Ngo
*Assistant Examiner*—Clemence Han
(74) *Attorney, Agent, or Firm*—Jacobson Holman PLLC

(57) ABSTRACT

An IP-to-PLMN gateway (IPG) enables extension of the PLMN messaging domain into IP domains. Enhanced service functions in a PLMN (such as store and forward, message waiting) are carried over into the messaging service available in the IP domains. The IPG has an SME interface which interfaces on the mobile network side with an SMSC. A presence management function detects and maintains data relating to presence status of users in the IP domain.

35 Claims, 3 Drawing Sheets

IPG Node Functional Entities for SMS Service

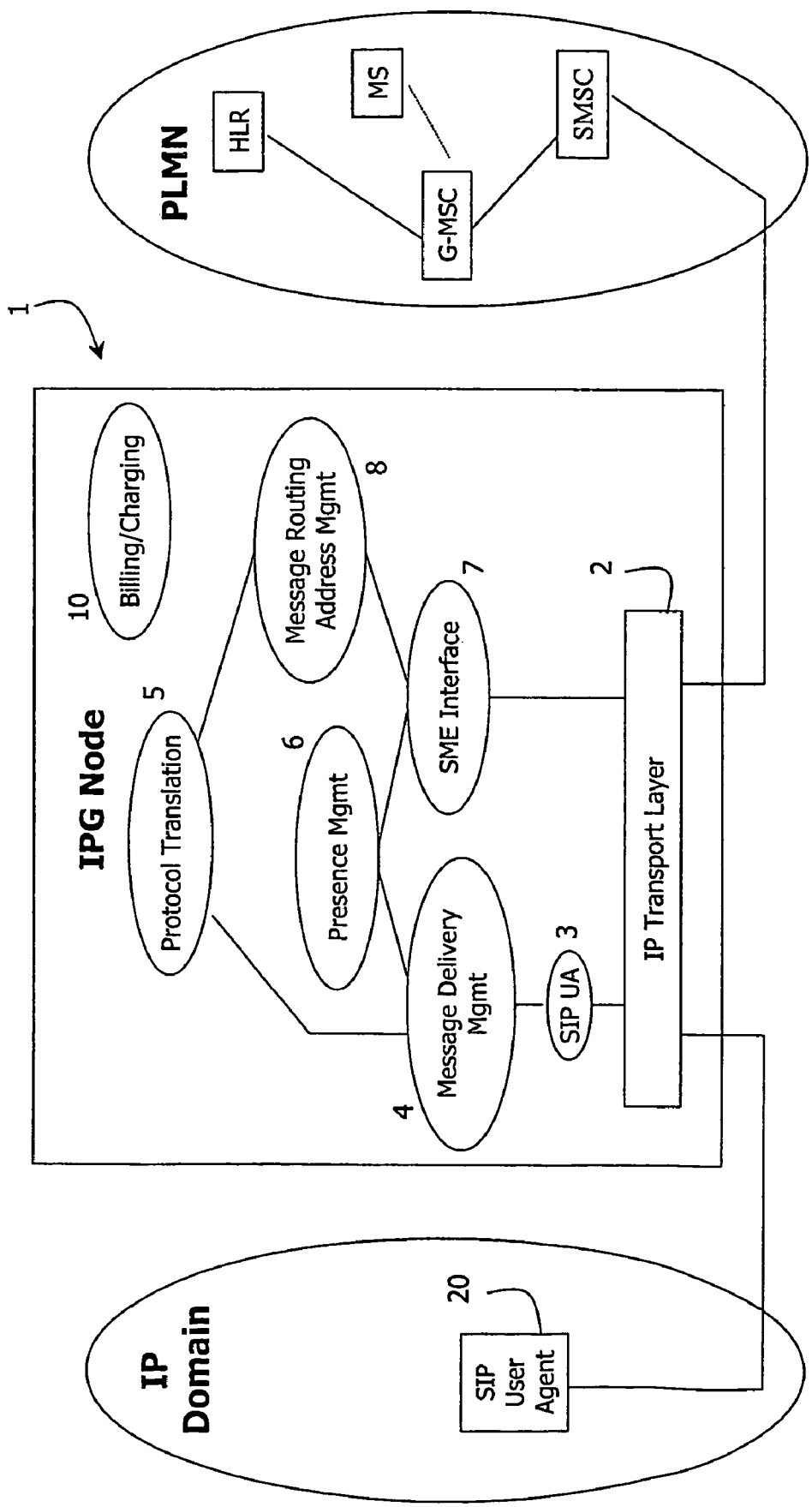
Fig. 1: IPG Node Functional Entities for SMS Service

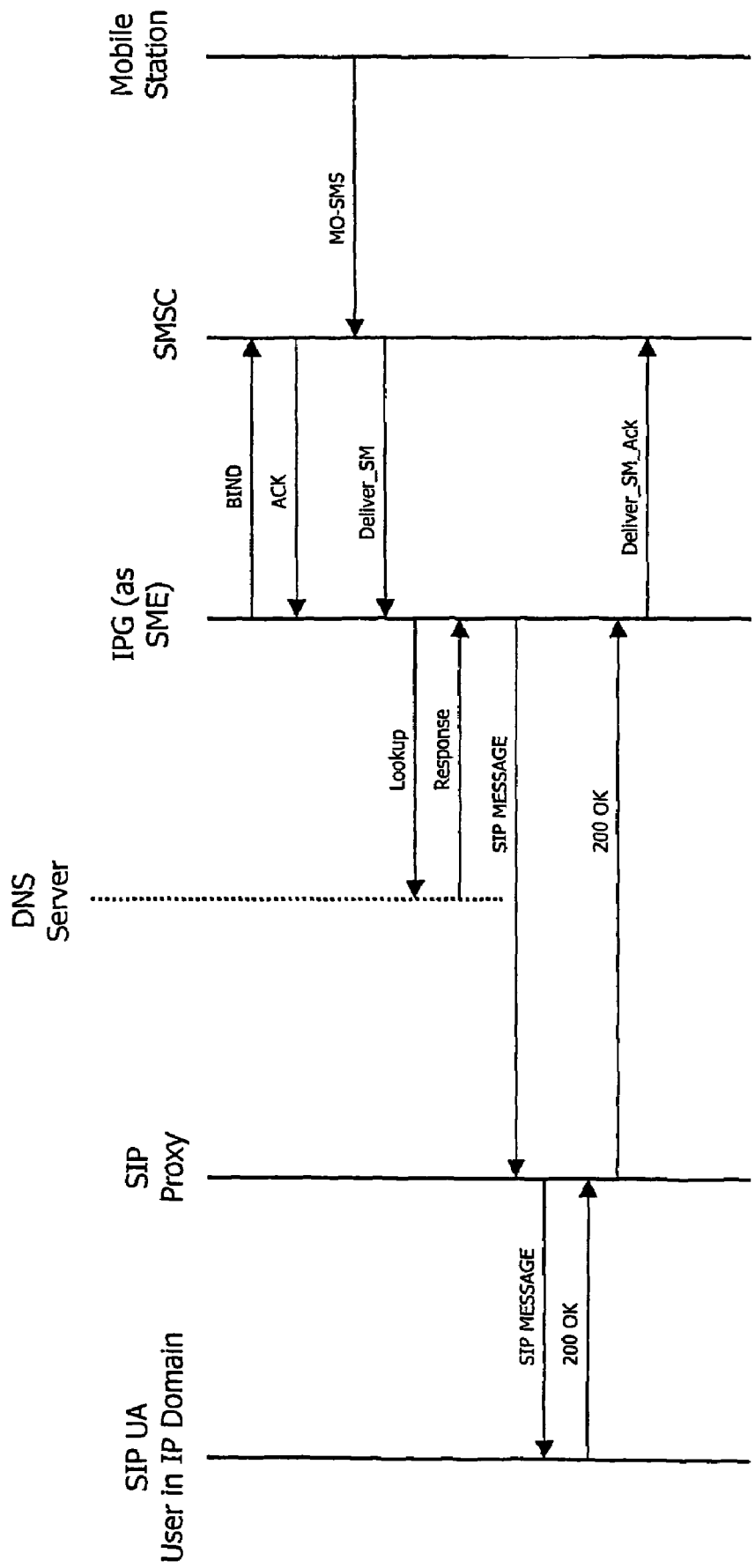
Fig. 2: Message Flow for SMS Terminating in IP Domain

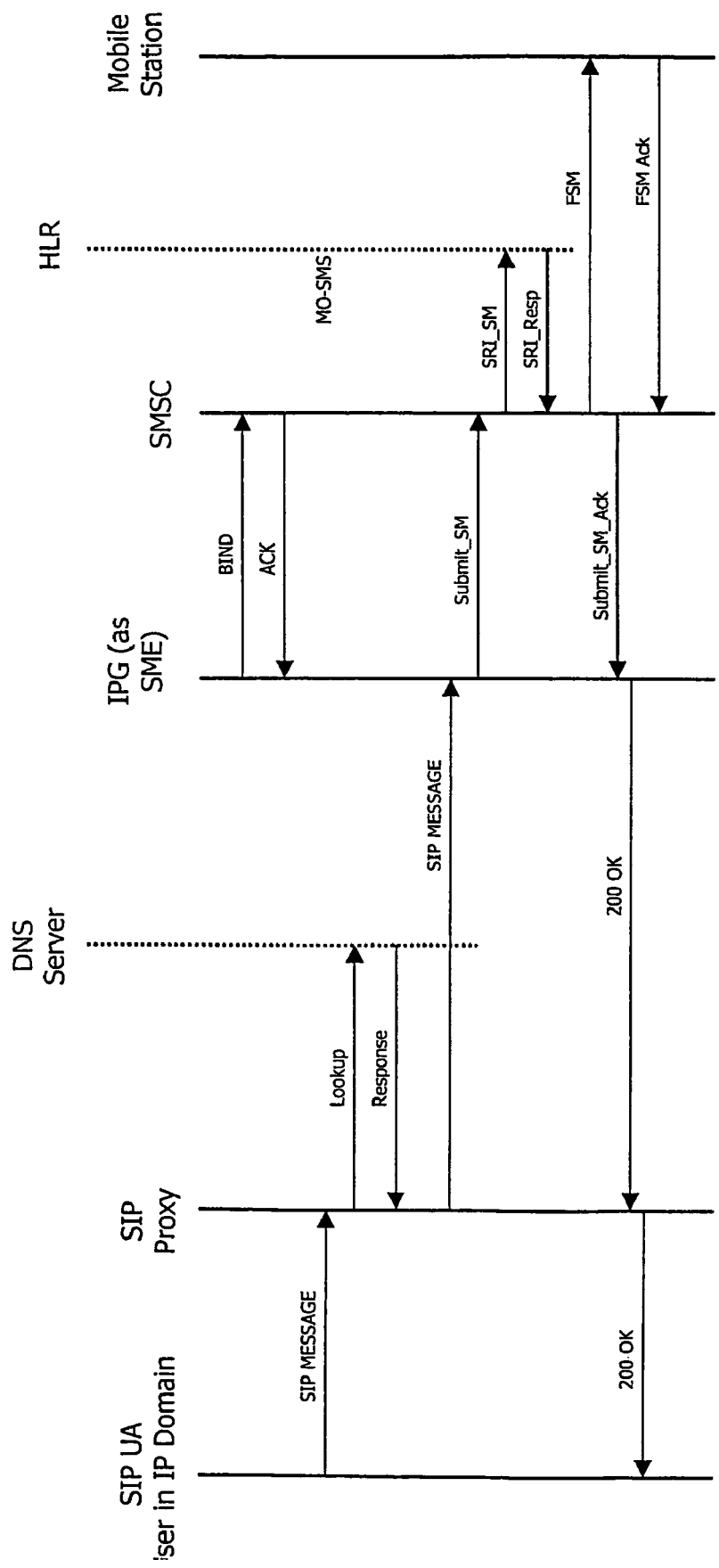
Fig. 3: Message Flow for SMS Terminating in PLMN Domain

CONTROL OF PLMN MESSAGING SERVICES IN IP DOMAINS

This is a continuation of PCT/IE03/00073 filed May 13, 2003 and published in English which in turn is based on provisional Application Ser. No. 60/379404 filed May 13, 2002.

FIELD OF THE INVENTION

The invention relates to messaging.

PRIOR ART DISCUSSION

Messaging services in PLMN domains have reached significant levels of usage amongst mobile subscribers. The Short Message Service (SMS) originated in GSM networks and has spread to many different network technologies, now being found in ANSI-41 TDMA and CDMA networks and has also been deployed in Japanese PDC networks. This growth has been driven by subscriber demand for messaging services, providing a means of communication between individuals and groups that was not available previously. With the advent of 2.5G and 3G network technologies, there is now significant interest in extending the range of messaging services beyond the boundaries of the mobile networks by providing inter-operability with packet data network (PDN) domains. The internet domain has seen massive growth in recent years with the numbers of users contactable via internet addresses increasing significantly each year. Furthermore, mobility of internet users is increasingly supported by Mobile IP protocols, allowing an individual user to be contactable at the same internet address irrespective of the geographic location where they connect to the internet.

This invention is directed towards providing a control and transport entity that enables implementation of an integrated messaging service, providing the means for origination, transport and delivery of messages between PLMN and PDN domains (fixed and mobile).

SUMMARY OF THE INVENTION

According to the invention, there is provided a gateway comprising:
an interface to a packet network,
an interface to a mobile network, and
a processor for performing protocol translation for messages communicating between packet and mobile networks connected to the interfaces.

In one embodiment, the processor comprises a presence management function for detecting and maintaining presence information in the packet network, and for mapping a presence state to a form used in the mobile network.

In another embodiment, the presence management function functions as a Session Initiation Protocol (SIP) registrar.

In a further embodiment, the presence management function comprises an interface for accessing an external SIP registrar in an IP network.

In one embodiment, said interface maintains a cache of SIP entries.

In another embodiment, the presence management function stores user device capabilities, and the protocol translation function selects a message delivery protocol based on device capabilities.

In a further embodiment, the processor further comprises a message routing function for routing a message having a mobile network address format to a user in a packet network.

In one embodiment, the routing function converts a mobile network format address to a packet network format address.

In another embodiment, the routing function routes a single message from one network to multiple addresses in another network.

In a further embodiment, the routing function interfaces with packet network broadcast services.

In one embodiment, the gateway comprises an interface for emulating a mobile network entity such as an SME or an SMSC.

In another embodiment, the emulation capability of the interface allows operation of the gateway without re-configuration of a conventional mobile network.

In a further embodiment, the interface extracts a URL from message text, provides a deferred acknowledgement, and notifies an SMSC of a mobile network that a user in the IP domain has become active.

In one embodiment, the processor comprises a message delivery management function for extending a store and forward delivery capability to the IP domain.

In another embodiment, the presence management function notifies an entity in a network if a subscriber enters the domain of another network.

In a further embodiment, the presence management function notifies the entity if the subscriber is the intended recipient of a message awaiting delivery.

In one embodiment, the notification signal specifies in a dynamic manner search criteria for the network entity ranging from a direct match criterion to a partial match criterion.

In another embodiment, the gateway comprises means for modifying a message in a network entity such as an SMSC to charge its destination address.

In another aspect, the invention provides a method for communicating between a mobile network and a packet network comprising the steps of:
a mobile device in the mobile network transmitting a message with a mobile network address of a gateway as defined above and an embedded destination packet network user address;
an entity of the mobile network routing the message to an interface of the gateway; and
the gateway receiving the message at the interface, stripping out the destination packet network address, and routing the message to the packet network user with the packet network address.

In one embodiment, the packet network address is in a Session Initiation Protocol format.

In another embodiment, the gateway maintains a table associating the packet network addresses with a mobile-network-standard address for the packet network user, and for a subsequent message the mobile network user includes only a mobile network standard address and the gateway retrieves the packet network address from the table.

In a further embodiment, the gateway binds to at least one mobile network entity for communication of messages.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which:

FIG. 1 is a schematic diagram illustrating interaction between a PLMN messaging domain, a control entity between the PLMN and IP domains and a messaging-enabled IP domain;

FIG. 2 is a diagram illustrating a signalling flow for SMS originating in the PLMN and terminating in the PDN; and FIG. 3 is a diagram illustrating a signalling flow for an SMS originating in the PDN domain and terminating in the PLMN domain.

DESCRIPTION OF THE EMBODIMENTS

The invention provides an IP to PLMN Gateway (IPG) node 1 for controlling the delivery of common PLMN-based messaging services (for example, SMS, Cell Broadcast) to users in IP domains (for example, users with fixed internet addresses or users currently active on a Wireless LAN). The IP domain users may be fixed or mobile. The mobile subscribers will generally be capable of roaming between the PLMN and the IP Domains. Two forms of roaming exist: (1) Home PLMN (HPLMN) subscriber roaming, where the PLMN mobile subscriber roams into the IP domain owned by the PLMN operator, and (2) Visited PLMN (VPLMN) subscriber roaming, where a PLMN mobile subscriber 'roaming' in another PLMN (using existing inter-PLMN roaming agreements) roams into the IP Domain of the Visited PLMN.

Extending the reach of messaging services from PLMN's to IP domains therefore creates a wider community of messaging users and removes the mobile handset as the sole originating or terminating device for mobile messaging. For example, a mobile subscriber may wish to send a message to another user who may not be contactable via a mobile handset but may be present in a packet data domain, such as Wireless LAN or fixed internet. Similarly, an internet user may wish to originate a message for delivery to a mobile subscriber on their handset.

The PDN messaging communities may assume a number of different forms. A community in one PDN Domain could be the set of users in an airport connected to a Wireless LAN hotspot (e.g. 802.11, HiperLAN), while another community could be 'fixed' subscribers of an interactive TV domain. All such PDN domains could be part of a single greater PDN domain from the perspective of the PLMN or equally they could be considered as separate PDN domains.

The invention is described in the context of a GSM PLMN and an IP-based PDN. However, the invention is equally applicable to alternative mobile network technologies such as CDMA, IDMA, PDC and UMTS, as well as in PDN technologies beyond IP-based networks.

The IP-to-PLMN Gateway (IPG) node enables the extension of the PLMN messaging domain into IP domains such as fixed internet and Wireless LAN networks. The IPG node 1 comprises an IP transport interface 2 connected to a Session Initiation Protocol (SIP) user agent (UA) 3, in turn connected to a message delivery function 4. The function 4 is connected to both a protocol translation function 5 and to a presence management function 6. An SME interface 7 is connected on one side to the interface 2 and on the other side to the presence management function 6 and to a message routing address management function 8. The nodes also comprises a billing function 10.

The IPG implements a set of control and transport functions that allow messaging services and formats common in the PLMN domain to be suitably adapted for origination or delivery in the IP domain. An advantageous element of the invention is that all of the enhanced service functions in the PLMN (for example, store and forward, message waiting and alert functions) are carried over into the messaging service available in the IP domain. The IPG ensures that no modification of the existing message service equipment in the PLMN is necessary for a fully functional messaging service in the IP domain. However, the invention also provides for extensions to the standard interfaces between the IPG node and the messaging platforms to allow for optimised delivery of messaging services in the IP domain. A further aspect of the invention is that it can be applied to all PLMN technologies supporting messaging services (for example, Short Message Service, Cell Broadcast, Multimedia Messaging, Instant Messaging) and any IP domain (for example fixed or mobile internet). An implementation of the invention in the context of a GSM PLMN and fixed network IP domain is described below, and illustrated for a Short Messaging Service.

In a GSM network, the Short Messaging Service is provided by a Short Message Service Centre (SMSC) network element. The SMSC communicates with other elements in the PLMN (such as HLR's, VLR's, MSC's) by means of an Interworking Gateway MSC (I-GMSC). In addition, the SMSC provides an application interface that allows service developers to bind an application to the SMSC. An example of such an interface protocol is the Short Message Peer-to-Peer (SMPP) protocol specified by the SMS Forum. Within the PLMN domain, the SMSC may receive a short message (SM) from an external application via SMPP addressed to a particular mobile subscriber MSISDN. The SMSC stores the SM in an internal store and then requests routing information from the HLR for the mobile subscriber. If routing information is received, it indicates the current serving MSC/VLR for the mobile subscriber. The SMSC submits the SM to the serving MSC/VLR for delivery to the mobile subscriber. If delivery is successful, the SMSC marks the SM as delivered in the message store. If delivery is not successful (perhaps because the mobile subscriber is not contactable in the serving network), the SMSC will attempt delivery at a later time (it may set a message waiting flag in the HLR so the SMSC is alerted if the subscriber becomes active in a network, or it may schedule the message for a retried delivery attempt according to an internal retry algorithm).

The IPG node 1 incorporates all required functional elements that allow the full range of messaging capabilities from the PLMN to be offered in the IP domain. In the embodiment of the invention illustrated in FIG. 1, the main functional entities in the IPG node 1 are:

(a) Short Message Entity (SME) interface 7 to the SMSC in the PLMN,
(b) subscriber presence management 6,
(c) protocol translation 5,
(d) message delivery management 4,
(e) message routing and address management 8,
(f) billing and charging management 10, and these functional entities are tailored according to the requirements of each particular embodiment of the invention. For example, in the current embodiment of the invention the SME interface 7 to the SMSC is based on the SMPP protocol. Subscriber presence management, protocol translation and message delivery management are based on the Session Initiation Protocol (SIP).

Referring to FIG. 1, an end-to-end description of a short messaging service between the PLMN and IP domains is provided below.

PLMN-Origination/IP Termination:

A mobile subscriber MS uses a GSM PLMN to originate an SMS towards another user known to the mobile subscriber. The mobile subscriber is aware that the recipient does not use a mobile handset but can receive SMS on their fixed internet service via a SIP URL when they are connected to the network. The mobile subscriber specifies a destination MSISDN corresponding to the IPG's SME interface 7 and specifies the user's SIP URL as a text field in the message. When the mobile subscriber sends the message it is received by the SMSC in the PLMN, which routes the message to the SME interface 7 of the IPG node 1. The. SME interface 7 extracts the destination SIP URL from the message text and presents this information to the subscriber presence management function 6. The SMPP format of the message is submitted to the message routing entity 8 and protocol translation entity 5, where the message is converted to a format suitable for delivery over SIP. The presence management function 6 uses SIP Proxy and SIP Registrar entities to determine the current status of the destination user. If it is determined that the user is connected to the IP domain, the properly formatted SM is submitted to the message delivery management function 4 for delivery. Message delivery is attempted using the SIP User Agent 3, which communicates with a peer SIP User Agent 20 on the destination user's device. If the message is successfully delivered to the destination user this status is returned via the SME interface 7 to the SMSC. If the message is not delivered, the message delivery management function 4 may set a message waiting flag for the destination user. If the user connects to the IP domain, this presence is detected via the presence management function 6 and a notify signal is sent to the SMSC in the PLMN, prompting it to attempt delivery of the SM via the SME interface 7 once more. Thus the full functionality of the SMS service in the PLMN is carried over into the IP domain. The billing and charging management function 10 is invoked to provide the billing function for the IPG node 1. To support a pre-paid billing model, a pre-delivery credit check may be invoked to check the user's credit balance before the message delivery attempt is initiated If the credit check returns a positive indication, the message-delivery is attempted and the appropriate charge deducted from the user's account for a successful delivery. For a post-paid billing model, a CDR (call detail record) event is produced for both successful and unsuccessful delivery attempts. The CDR event contains all relevant information such as originating address, destination address, and delivery status that may be used to produce subscriber billing information.

IP-Origination/PLMN Termination:

A user in the IP domain 9 initiates SM to a mobile subscriber in the PLMN domain, addressed via a SIP URL containing the mobile subscriber's MSISDN. The message is submitted via the SIP User Agent 20 on the user's device, which routes the message based on the standard SIP URL mechanism to the SIP user agent 3 in the IPG node 1. At the IPG node 1 the SIP user agent 3 processes the URL to derive the mobile subscriber's MSISDN. The SM is passed to the protocol translator 5 where it is converted to an SMPP format, with the mobile subscriber's MSISDN as the destination address. The re-formatted message is forwarded to the SME interface 7, which submits it over SMPP to the SMSC in the PLMN. At this point, an acknowledgement for the message submission may be returned to the user in the IP domain via the SIP user agent 3. Further processing of the SM delivery is handled entirely within the PLMN domain using the standard SMS functionality. For message delivery in this direction, the subscriber presence and message delivery management functional entities 6 and 4 are not used.

The billing and charging management function 10 is able to support a range of billing models for the service, including charge or no-charge for delivery of terminating messages, charge or no-charge for origination of a message, and pre- and post-paid models. For a pre-paid billing model, the message delivery or message origination function is suspended while the billing and charging function performs a credit query against a subscriber. If the credit check is positive, the delivery or origination function is resumed. If the credit check is negative, the delivery or origination function is cancelled and a credit recharge option may be presented to the subscriber instead. In all cases, the billing and charging function 10 records CDR events for message submission and delivery attempts. These CDR events may be processed to generate subscriber billing information for post-paid subscribers, or may be used simply for audit and reconciliation purposes in a pre-paid billing model.

Other Addressing Formats for the IP Domain:

Other addressing formats may be used to specify the address of a user in the IP domain and are implemented by the PG node 1. Some examples of the alternative addressing formats supported by the IPG are given below.

MSISDN-like address—a non-PLMN user receives an MSISDN-like address:

MSISDN-like element in SIP URL—a non-PLMN user receives an MSISDN-like address and this is incorporated into a SIP URL:

'Real' MSISDN in SIP URL—a PLMN user may opt to receive messages in an IP domain and their PLMN MSISDN may be incorporated into a SIP URL for this purpose:

Group addresses comprising MSISDN-like or group 'name' elements—this addressing format is used for point-to-multipoint services.

Geographic or area addresses comprising MSISDN-like or location 'name' elements—this addressing format is used for broadcast services.

SIP URL representing a PLMN user—this form of address is used as the destination address of a PLMN user when a SM is being originated by an IP user. The PLMN user's real MSISDN is usually embedded in the SIP URL.

These addressing formats may be processed by the IPG node 1 to support direct addressing of users in the IP domain from the PLMN domain, such as enabling a PLMN user to invoke the 'Reply' function when a message has been received from a user in the IP domain.

A more detailed description of the functions implemented in each of the functional entities is provided below.

SME Interface 7

This functional entity is responsible for ensuring communication between the IPG node 1 and the SMSC in the PLMN. In the current embodiment of the invention, communication between the SMSC and the IPG is ensured using the SMPP protocol. In addition to protocol handling, the SME interface 7 also incorporates specific functions that allow the IPG node 1 to appear to the SMSC as though it were a standard PLMN SME. These include:

Extraction of the SIP URL from the message text

Deferred acknowledgement to a message submitted for delivery from the SMSC

Ability to generate a notify signal to alert the SMSC that a user in the IP domain has become active (i.e. presence has been detected).

Subscriber Presence Management Function 6

This functional entity is responsible for detecting and maintaining the presence status of users in the IP domain. In this embodiment, these capabilities are based on the mechanisms defined within the SIP protocol, i.e. it functions as a SIP Registrar and is capable of processing the SIP REGISTER messages sent by the SIP user agent 20 in the IP domain. In this case, the IPG node 1 stores the SIP-URI and IP address of the 'registered' user.

It is possible that a SIP Registrar is already present in the IP network domain. In this case the presence management entity 6 queries the SIP Registrar to determine presence information for the IP domain user whenever required for a message delivery attempt. In order to reduce communications overhead with the external SIP Registrar, the function 6 incorporates a SIP registry cache which stores presence information for a configurable period, thus avoiding repetitive queries to the SIP Registrar. In the event of a message delivery failure due to absence of the IP domain user, the SIP Registry Cache entry for the user is automatically removed.

Protocol Translation

This entity provides the translation between the signalling protocols used in the PLMN and the protocol used in the IP domain. In the current embodiment of the invention, the SIP protocol is used for delivery of messaging services in the IP domain. Communication with the PLMN domain is performed using SMPP and the protocol translation entity performs the conversion to/from the SMPP and SIP protocols.

In general the IP domain protocol used to terminate a message will be determined by the capabilities of the user device addressed in the message 'destination address' parameter. The IPG node 1 will select the message delivery protocol based on the user device capabilities. The user agent device capabilities will be transmitted to the IPG during user registration in the IP Domain. These user agent profiles will be stored by the IPG presence function.

Message Delivery Management 4

This functional entity is responsible for ensuring that the store and forward messaging delivery model from the PLMN domain is extended to the IP domain. When a message is received from the PLMN domain for delivery to the IP domain, the IPG attempts delivery using the selected IP domain protocol. Message delivery using the SIP protocol is described below for the current embodiment of the invention.

When a message is received from the PLMN via the SME interface 7 the message delivery management entity 4 receives the message after it has been converted to a SIP format by the protocol translation entity 5 and the destination address (SIP URL) in the IP domain has been extracted. The delivery entity may first check the presence of the user in the IP domain by submitting a query to the SIP Registrar function. If the user is present, the current contact address of the user may be returned by the SIP Registrar. Alternatively, the delivery entity may attempt to resolve the SIP URL by another means such as via DNS or through an internal query using a proprietary protocol. The delivery entity 4 generates a SIP MESSAGE request properly formatted for delivery of the message to the user. Depending on the delivery protocol in use, the SIP MESSAGE may carry the message within its payload, or alternatively a SIP INVITE request may be used to establish a session with the user in which the message will be transferred using an appropriate session protocol. Assuming direct delivery using the SIP MESSAGE request, if a contact address has already been resolved, the SIP MESSAGE can be sent directly via the SIP User Agent within the IPG. Alternatively, the SIP MESSAGE can be submitted via a SIP Proxy, which takes responsibility for resolving the current contact address for the user. If the message is successfully delivered to the user, a positive acknowledgement is received by the delivery entity in the form of a 200 OK response. This status information is then returned to the SMSC in the PLMN via the SME interface 7, where the message can be marked as delivered.

If the transfer of the message fails (due to resource restrictions, network problems or because the user agent is not registered), then the delivery entity 4 sets a Message Waiting Data (MWD) flag for the UAC within the PG, storing the address of the originating SMSC. Multiple SMSC addresses may be stored against a single UAC, each representing a source SMSC where messages awaiting delivery to the UAC are stored. At a subsequent time, when the user registers in the IP domain, the IPG node 1 detects that the MWD flag has been set for the user. The delivery entity generates an SMPP 'Notify' message to be sent to all SMSC addresses stored within the user's MWD flag. The notify message is used by the SMSC's to trigger a new delivery attempt for any messages awaiting delivery to the user in the IP domain. The retried messages are received by the IPG node 1, which then proceeds with the delivery to the now-registered UAC as previously described.

This invention specifies an enhanced implementation of the 'notify' message which allows the SMSC and the IPG node 1 to cooperate to optimise delivery attempts to users in the IP domain even if a direct address has not been allocated for the user. Also, the presence management function 6 can determine if a subscriber with messages 'waiting' becomes present in the IP domain, and notify the SMSC. An enhanced notify message contains the SIP URL of the destination user. When received by the SMSC, the enhanced notify mechanism implemented at the SMSC scans the waiting messages for the IPG node 1 and extracts only those messages which match the notified SIP URL. The criteria for a 'match' to the notified SIP URL may be modified in a dynamic way, for example an exact match may be required, or a partial match on the domain, or some part of the domain may be sufficient. In an alternative embodiment of the invention, the notify message itself may contain an element specifying the required matching criteria on a per-notification basis.

Message Routing and Address Management 8

This functional entity ensures that messages are routed appropriately between the PLMN and IP domains. It also provides a capability for assigning a PLMN-compatible address to an IP domain address (e.g. SIP URL), thereby allowing a user in the PLMN domain to address the IP domain user directly using an MSISDN-like address. With this capability, the invention allows direct messaging between users in the PLMN and IP domains, for example a user in the PLMN domain can use the 'Reply' function to respond to a message received from a user in the IP domain. Operation of the principal addressing formats supported by the IPG node 1 is described below.

1. User in IP Domain is Addressed using a SIP URL:

When a PLMN user sends a message to a user in the IP domain they are required to enter the SIP URL in a special text field in the body of the message while entering a well-known MSISDN as the destination address, which ensures the message is routed to the IPG node 1. When the message is received by the IPG node 1, the SIP URL is extracted from the message and forwarded to the address management entity 8. The SIP URL is checked to see Whether it has been assigned an MSISDN-like address from the range of MSISDN numbers specified by the IPG node 1 when it bound to the SMSC. If no MSISDN-like number has been allocated, the address management entity 8 selects a free MSISDN from the IPG range and creates an association with the SIP URL that is stored in the IPG. Once assigned, this MSISDN-like number may be used as a direct address for the IP user with respect to the PLMN domain. If the message delivery attempt to the SIP URL is successful, a delivery receipt can be generated using the MSISDN-like number as the originating address. When received by the PLMN subscriber, this address can be as a direct destination address for the IP user, removing the need to specify a SIP URL in the message text in future messages. When the IPG receives a message for an P user using the MSISDN-like direct address, the address management entity 8 retrieves the SIP URL automatically from the IPG tables to complete the delivery in the IP domain.

In the event of a message delivery failure, the IPG node 1 replaces the original (IPG) destination address with the newly assigned MSISDN-like destination address in the copy of the message stored in the SMSC. Future retries of the message then use the MSISDN-like address as the destination address. If the MWD flag is set for the IP user, the 'notify' message sent to the SMSC contains the MSISDN-like address, thus automatically triggering retries only for the specified subscriber.

2. User in IP Domain is addressed using an MSISDN-like Address:

In this case, a provisioning interface in the IPG node 1 is used to create an association in the internal table between the MSISDN-like address and the SIP URL used for delivery in the IP domain. With this addressing mode, the user in the PLMN domain must be informed of the MSISDN-like address of the user in the IP domain, but is not required to know the associated SIP URL.

3. User in IP Domain has MSISDN-like Element in the SIP URL Address:

In this case, the IPG node 1 is configured to extract the MSISDN-like element from the SIP URL and, conversely, to re-create the original SIP URL from the MSISDN-like address.

4. User in IP Domain has 'real' MSISDN Element in the SIP URL Address:

To enable this type of addressing, the IPG automatically creates a prefix for the real MSISDN to ensure that it falls within the range of MSISDN-like addresses specified when the PG binds to the SMSC. A user in the PLMN domain may specify the SIP URL in a text field of the message or may be informed of the special prefix to use when addressing the PLMN subscriber in the IP domain. In either case, the address management entity automatically carries out the address conversion function as required between the PLMN and IP domains.

5. User in PLMN Domain has 'real' MSISDN Element in the SIP URL Address:

This type of addressing is used to allow an IP user to originate a SM for delivery to a PLMN subscriber. The IPG automatically processes the SIP URL to extract the real MSISDN information and this is then used as the destination address to forward the message into the PLMN domain.

Billing and Charging Management 10

This functional entity is responsible for management of billing and charging elements in the node 1. The important functions performed by this entity include:

Generation of CDR events related to the origination, and delivery of messaging for subscribers in the IP domain.

Management of a charging interface to an external pre-paid system that handles pre-paid billing for the IPG.

Where a pre-paid credit query is supported by the external pre-paid system, this entity is capable of suspending a message origination or delivery attempt until a response to the credit query has been received. Based on the response received, it is capable of either resuming or cancelling the delivery or origination attempt.

These functional entities may be replaced or modified to adapt the invention for control or delivery of other messaging services such as point-to-multi-point, broadcast, or multi-media messaging. The SME interface 7 would be replaced by a message broadcast entity for a broadcast service, or by an interface to an MMSC for a multi-media service. Similarly, the protocol translation, subscriber presence management, and message delivery management entities would be replaced or modified according to the protocols selected for use for a particular service. The message routing and address management entity 8 would be extended to incorporate address management for group and geographic address type. For example, a broadcast message may be addressed to a geographic location identified by a location 'name'. The address management entity 8 would convert this name into a list of Broadcast SIP URL's, which would be further resolved via a SIP proxy into well-defined broadcast IP subnet addresses, which would route the broadcast message to specific WLAN base stations covering the specified geographic location.

Illustration of SM Service Terminating in an IP Domain from a PLMN User:

The message flow for this service is illustrated in FIG. 2 where a direct address for the user in the IP domain has been used by the PLMN user. The IPG node 1 functioning as an SME 'Binds' to the PLMN SMSC on behalf of a block of routing numbers which are allocated as direct addresses to users in the IP domain. The direct addresses may therefore be specified in an MSISDN-like format.

When the Mobile Station(MS) submits the SMS to the SMSC, it is routed to the IPG node 1 based as the destination address in the message matches the range specified for the IPG node 1. The IPG node 1 receives the DELIVER_SM from the SMSC and the destination address contained in the DELIVER_SM is translated to a SIP URL for the IP user using address management entity. The SIP URL is resolved to an IP Address either using a DNS query or the message may be routed via a SIP Proxy/Registrar. The IPG creates a SIP MESSAGE request from the SMPP DELIVER_SM message and delivers the SMS to the destination user encapsulated in the SIP MESSAGE.

The successful receipt of the SIP MESSAGE request by the UAC is indicated to the IPG on receipt of the 200 OK response. The IPG translates this 200 OK to an SMPP DELIVER_SM_ack response that is sent to the SMSC.

Illustration of SM Service Terminating in a PLMN Domain from an IP User:

The message flow for this service is illustrated in FIG. 3. When a SIP UAC requests to send an SMS to a PLMN subscribe, the PLMN subscribers' SIP URL domain name is resolved to the IP address of the IPG either by a DNS lookup or the message is routed via a SIP Proxy. The SIP MESSAGE request is forwarded to the IPG functioning as a SIP UAS.

The IPG node 1 receives the SIP MESSAGE and passes it to the IPG SMPP translator. The SIP MESSAGE request is translated to an SMPP Submit_SM message, and the PLMN user's MSISDN is extracted from the SIP URL by the address management entity. The IPG acting as an SME forwards the Submit_SM to the SMSC. The SMS-GMSC queries the PLMN HLR for the subscriber's serving MSC, creates the FSM and then forwards the SMS to the serving MSC for delivery to the MS.

Some additional detail relevant to the implementation of the IPG node 1 is described below.

Communication between the IPG node 1 and the SMSC is based on the standard SMPP protocol specified by the SMS Forum. In order to provide enhanced capabilities for the control of messaging in an IP domain, communication may use some extensions to the standard SMPP operations, with associated modifications to the SMPP protocol modules on the IPG node 1 and in the SMSC. In particular, the extended protocol definition allows the IPG node 1 modify a message in the SMSC message store to change the destination address on the message to a direct address assigned to a user in the IP domain.

The IPG node 1 is deployed in the network as a highly available and scaleable node. It may be configured as a multi-node cluster, in which individual nodes may service different MSISDN-like ranges assigned to users in the IP domain. The nodes may also operate as active/standby pairs or in a N+M redundant configuration to provide high availability configurations for network operators. If an active node should fail, a standby node or an available redundant node can be switched into the cluster in place of the failed node. A robust data-sharing mechanism is implemented to allow the newly activated node to access the associations between SIP URL's and MSISDN-like addresses that were previously created by the failed node.

In a minimum configuration, the IPG may be deployed as a single node with the ability to dynamically switch in additional nodes to meet increasing capacity demands. For a minimum high-availability configuration, the IPG node 1 is deployed as a dual-node cluster operating in active/standby node.

The IPG node 1 also provides a billing interface that is suitable for both post-paid and pre-paid operation. For post-paid operation, the IPG node 1 produces CDR event records for each message submission, delivery attempt and delivery reports. For pre-paid operation, the IPG implements a charging interface that can be adapted to communicate with a pre-paid billing system. The charging interface and the message delivery entity in the IPG are designed to perform a pre-delivery credit check on a subscriber's account before invoking a delivery attempt if this operation is supported by the pre-paid billing system.

It will be appreciated that the invention provides a mechanism that ensures that the full capabilities of messaging in the PLMN domain can be delivered to users in the IP domain. While this has been illustrated for SMS service in the above description, the invention can also be applied in a similar manner to other messaging services such as instant messaging, multi-media messaging, and message broadcast services. The IPG can be re-configured for delivery of a different message type by implementing an appropriate interface module to the appropriate messaging server in the PLMN domain, for example Instant Messaging server, Multi-media server, etc. In addition, the node 1 may be suitably configured to operate successfully with a range of network technologies both in the PLMN domain and in the packet data domain.

The invention is not limited to the embodiments described but may be varied in construction and detail.

The invention claimed is:

1. A gateway comprising:
   an interface to a packet network;
   an interface to a mobile network;
   a processor for performing protocol translation for messages communicating between the packet and the mobile networks connected to the interfaces;
   wherein the processor comprises a presence management function for detecting and maintaining presence information of users in the packet network, and for mapping a presence state of users in the packet network to a form used in the mobile network; and
   the gateway comprises a message routing function and a message delivery management function for controlling delivery of a message to the packet network if the presence management function determines presence of a destination user device in the packet network, and wherein the message delivery management function comprises means for extending store and forward message delivery capability of the mobile network to the packet network by:
   checking the presence of the destination user device in the packet network, and if present transferring the message to the packet network, and if not present or message transfer fails for any other reason setting a flag;
   if the destination user device is subsequently present in the packet network, detecting that the flag has been set and notifying an originating mobile network entity to trigger said entity to attempt message delivery again; and
   wherein the presence management function sends a notification signal to notify said mobile network entity if a user in the packet network is the intended recipient of a message awaiting delivery; and wherein the notification signal specifies in a dynamic manner search criteria to be used by said mobile network entity ranging from a direct match criterion to a partial match criterion.

2. The gateway as claimed in claim 1, wherein the presence management function operates as a Session Initiation Protocol (SIP) registrar.

3. The gateway as claimed in claim 1, wherein the presence management function comprises an interface for accessing an external Session Initiation Protocol (SIP) registrar in an Internet Protocol (IP) network.

4. The gateway as claimed in claim 1, wherein the presence management function operates as a Session Initiation Protocol (SIP) registrar and wherein the presence management function comprises an interface for accessing an external SIP registrar in an Internet Protocol (IP) network.

5. The gateway as claimed in claim 1, wherein the presence management function comprises an interface for accessing an external Session Initiation Protocol (SIP) registrar in an Internet Protocol (IP) network; and wherein said interface maintains a cache of SIP entries.

6. The gateway as claimed in claim 1, wherein the presence management function operates as a Session Initiation Protocol (SIP) registrar and wherein the presence management function comprises an interface for accessing an external SIP registrar in an Internet Protocol (IP) network; and wherein said interface maintains a cache of SIP entries.

7. The gateway as claimed in claim 1, wherein the presence management function stores user device capabilities, and the processor comprises a protocol translation function for selecting a message delivery protocol based on device capabilities.

8. The gateway as claimed in claim 1, wherein the presence management function stores user device capabilities, and the processor comprises a protocol translation function for selecting a message delivery protocol based on device capabilities, wherein the presence management function operates as a Session Initiation Protocol (SIP) registrar.

9. The gateway as claimed in claim 1, wherein the presence management function stores user device capabilities, and the processor comprises a protocol translation function for selecting a message delivery protocol based on device capabilities; and wherein the presence management function operates as a Session Initiation Protocol (SIP) registrar; and wherein the presence management function comprises an interface for accessing an external SIP registrar in an Internet Protocol (IP) network.

10. The gateway as claimed in claim 1, wherein the presence management function stores user device capabilities, and the processor comprises a protocol translation function for selecting a message delivery protocol based on device capabilities; wherein the presence management function comprises an interface for accessing an external Session Initiation Protocol (SIP) registrar in an Internet Protocol (IP) network.

11. The gateway as claimed in claim 1, wherein the presence management function stores user device capabilities, and the processor comprises a protocol translation function for selecting a message delivery protocol based on device capabilities; wherein the presence management function operates as a Session Initiation Protocol (SIP) registrar; and wherein the presence management function comprises an interface for accessing an external SIP registrar in an Internet Protocol (IP) network; and wherein said interface maintains a cache of SIP entries.

12. The gateway as claimed in claim 1, wherein the presence management function stores user device capabilities, and the processor comprises a protocol translation function for selecting a message delivery protocol based on device capabilities; wherein the presence management function comprises an interface for accessing an external Session Initiation Protocol (SIP) registrar in an Internet Protocol (IP) network; and wherein said interface maintains a cache of SIP entries.

13. The gateway as claimed in claim 1, wherein the routing function converts a mobile network format address to a packet network format address.

14. The gateway as claimed in claim 1, wherein the routing function routes a single message from one network to multiple addresses in another network.

15. The gateway as claimed in claim 1, wherein the routing function routes a single message from one network to multiple addresses in another network; and wherein the routing function interfaces with packet network broadcast services.

16. The gateway as claimed in claim 1, wherein the gateway comprises an interface for emulating a mobile network entity.

17. The gateway as claimed in claim 1, wherein the gateway comprises an interface for emulating a mobile network entity; and wherein the emulation capability of the interface allows operation of the gateway without re-configuration of a conventional mobile network.

18. The gateway as claimed in claim 1, wherein the gateway comprises an interface for emulating a mobile network entity; and wherein the interface notifies a network entity of the mobile network that a user in the packet network has become active.

19. The gateway as claimed in claim 1, wherein the gateway comprises an interface for emulating a mobile network entity; and wherein the interface notifies a Short Message Service Centre (SMSC) of the mobile network that a user in the packet network has become active.

20. The gateway as claimed in claim 1, wherein the gateway comprises an interface for emulating a mobile network entity; and wherein the interface extracts a Uniform Resource Identifier (URI) from a message, provides a deferred acknowledgement to a message submitted for delivery from said mobile network entity, and notifies said mobile network entity that a user in the packet network has become active.

21. The gateway as claimed in claim 1, wherein the gateway comprises an interface for emulating a mobile network entity; and wherein the interface extracts a Uniform Resource Identifier (URI) from a message, provides a deferred acknowledgement to a message submitted for delivery from a Short Message Service Centre (SMSC), and notifies the SMSC that a user in the packet network has become active.

22. The gateway as claimed in claim 1, wherein the gateway comprises an interface for emulating a mobile network entity; and wherein the emulation capability of the interface allows operation of the gateway without re-configuration of a conventional mobile network; and wherein the interface extracts a Uniform Resource Identifier (URI) from a message, provides a deferred acknowledgement to a message submitted for delivery from a Short Message Service Centre (SMSC), and notifies the SMSC that a user in the packet network has become active.

23. The gateway as claimed in claim 1, wherein the mobile network entity is a Short Message Service Centre (SMSC).

24. The gateway as claimed in claim 1, wherein the gateway comprises means for modifying a message in a network entity to change destination address of the message.

25. The gateway as claimed in claim 24, wherein the network entity is a Short Message Service Centre (SMSC).

26. The gateway as claimed in claim 1, wherein the message delivery management function comprises means for storing the address of a message originating mobile network entity, said entity storing messages awaiting delivery to a user in the packet network, and for notifying said network entity when the user subsequently is present in the packet network.

27. The gateway as claimed in claim 26, wherein the network entity is a Short Message Service Centre (SMSC).

28. The gateway as claimed in claim 1, wherein the message delivery management function comprises means for storing the address of a plurality of message originating mobile network entities, said entities storing messages awaiting delivery to users in the packet network, and for notifying said network entities when the users are subsequently present in the packet network.

29. The gateway as claimed in claim 28, wherein the network entities are Short Message Service Centres (SMSC).

30. A method for communicating between a mobile network and a packet network, the method comprising the steps of:

transmitting a message by a mobile device in the mobile network, said message including an address of a gateway and an address of a user in the packet network;

routing said message by a mobile network entity to an interface of said gateway, and the gateway interface receiving the message; and stripping out, by the gateway, the packet network user address from the message and routing the message to the user in the packet network with the packet network user address as the destination address of the message;

wherein the gateway comprising:

a processor for performing protocol translation for messages communicating between the packet and the mobile networks;

wherein the processor comprises a presence management function for detecting and maintaining presence information of users in the packet network, and for mapping a presence state of users in the packet network to a form used in the mobile network; and the gateway comprises a message routing function and a message delivery management function for controlling delivery of a message to the packet network if the presence management function determines presence of a destination user device in the packet network, and wherein the message delivery management function comprises means for extending store and forward message delivery capability of the mobile network to the packet network by:

checking the presence of the destination user device in the packet network, and if present transferring the message to the packet network, and if not present or message transfer fails for any other reason setting a flag;

if the destination user device is subsequently present in the packet network, detecting that the flag has been set and notifying the mobile network entity to trigger said entity to attempt message delivery again; and wherein the presence management function sends a notification signal to notify said mobile network entity if a user in the packet network is the intended recipient of a message awaiting delivery; and wherein the notification signal specifies in a dynamic manner search criteria to be used by said mobile network entity ranging from a direct match criterion to a partial match criterion.

31. The method as claimed in claim 30, wherein the packet network user address is in a Session Initiation Protocol format.

32. The method as claimed in claim 30, wherein the gateway maintains a table associating the packet network user address with an address in a standard protocol of the mobile network, and for a subsequent message the mobile device in the mobile network includes only said address in the mobile network standard protocol and the gateway retrieves the packet network user address from the table.

33. The method as claimed in claim 30, wherein the gateway maintains a table associating the packet network user address with an address in a standard protocol of the mobile network, and for a subsequent message the mobile device in the mobile network includes only said address in the mobile network standard protocol and the gateway retrieves the packet network user address from the table; and wherein the packet network user address is in a Session Initiation Protocol format.

34. The method as claimed in claim 30, wherein the gateway maintains a table associating the packet network user address with an address in a standard protocol of the mobile network, and for a subsequent message the mobile device in the mobile network includes only said address in the mobile network standard protocol and the gateway retrieves the packet network user address from the table; and wherein the gateway binds to at least one mobile network entity on behalf of a block of said standard protocol mobile network addresses of said table.

35. The method as claimed in claim 30, wherein the gateway maintains a table associating the packet network user address with an address in a standard protocol of the mobile network, and for a subsequent message the mobile device in the mobile network includes only said address in the mobile network standard protocol and the gateway retrieves the packet network user address from the table; and wherein the gateway binds to at least one mobile network entity on behalf of a block of said standard protocol mobile network addresses of said table; and wherein the packet network user address is in a Session Initiation Protocol format.

* * * * *